United States Patent
Vamanan et al.

(10) Patent No.: US 9,813,899 B2
(45) Date of Patent: Nov. 7, 2017

(54) METHODS AND APPARATUS OF EVOLVED NODE B AND USER EQUIPMENT FOR CAPABILITY INFORMATION SETTING

(71) Applicant: Intel IP Corporation, Santa Clara, CA (US)

(72) Inventors: Sudeep Manithara Vamanan, Nuremberg (DE); Hyung-Nam Choi, Hamburg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/326,419

(22) PCT Filed: Aug. 12, 2015

(86) PCT No.: PCT/US2015/044763
§ 371 (c)(1),
(2) Date: Jan. 13, 2017

(87) PCT Pub. No.: WO2016/025548
PCT Pub. Date: Feb. 18, 2016

(65) Prior Publication Data
US 2017/0215065 A1    Jul. 27, 2017

Related U.S. Application Data

(60) Provisional application No. 62/038,001, filed on Aug. 15, 2014.

(51) Int. Cl.
*H04M 3/00* (2006.01)
*H04W 8/24* (2009.01)
(Continued)

(52) U.S. Cl.
CPC ............. *H04W 8/24* (2013.01); *H04W 60/00* (2013.01); *H04W 76/02* (2013.01)

(58) Field of Classification Search
CPC ........ H04W 8/24; H04W 60/00; H04W 76/02
(Continued)

(56) References Cited

U.S. PATENT DOCUMENTS

2011/0014912 A1    1/2011 Ahluwalia et al.
2013/0022090 A1*   1/2013 Weng ................ H04L 25/03343
                                                            375/219
(Continued)

FOREIGN PATENT DOCUMENTS

EP        2747376 A1      6/2014
WO   WO-2014112848 A1     7/2014

OTHER PUBLICATIONS

"3GPP; TSG-SA; General Packet Radio Service (CPRS) enhancements for Evolved Universal Terrestrial Radio Access Network (E-UTRAN) access (Release 12)", 3GPP TS 23.401 V12.5.0, (2014).

(Continued)

*Primary Examiner* — Nghi H Ly
(74) *Attorney, Agent, or Firm* — Schwegman Lundberg & Woessner, P.A.

(57) ABSTRACT

Systems, apparatus, user equipment (UE), evolved node B (eNB), mobility management entities (MME), and methods are described for UE capability information setting. One example embodiment operates to set first UE capability information in an initial attach procedure; identify a temporary operating mode for the first UE associated with a second set of UE capability information; and change the capability information to a second set of UE capability information associated with the temporary operating mode. Various embodiments may signal between a UE, an eNB, and a MME to enable use of different sets of UE capability information for different temporary operating modes.

25 Claims, 8 Drawing Sheets

(51) Int. Cl.
*H04W 60/00* (2009.01)
*H04W 76/02* (2009.01)

(58) Field of Classification Search
USPC ................. 455/418, 422.1, 414.1, 552.1
See application file for complete search history.

(56) References Cited

U.S. PATENT DOCUMENTS

2013/0150024 A1* 6/2013 Burbidge .............. H04W 24/04
455/423
2013/0295946 A1* 11/2013 Panchal ................ H04W 16/14
455/452.1

OTHER PUBLICATIONS

"International Application Serial No. PCT/US2015/044763, International Search Report" dated Dec. 14, 2015, 3 pgs.
"International Application Serial No. PCT/US2015/044763, Written Opinion dated Dec. 14, 2015", 12 pgs.
"Summary of email discussion capabilities", Intel Corporation, R2-132814, 3GPP TSG-RAN WG2, (2013).

* cited by examiner

METHODS AND APPARATUS OF EVOLVED NODE B AND USER EQUIPMENT FOR CAPABILITY INFORMATION SETTING

PRIORITY CLAIM

This application is a U.S. National Stage Filing under 35 U.S.C. 371 from International Application No. PCT/US2015/044763, filed Aug. 12, 2015 and published in English as WO 2016/025548 on Feb. 18, 2016, which claims the benefit of priority to U.S. Provisional Patent Application Ser. No. 62/038,001 filed on Aug. 15, 2014 and entitled "OPTIMIZATIONS FOR SIGNALING OF UE RADIO CAPABILITY INFORMATION" each of which is incorporated herein by reference in its entirety.

TECHNICAL FIELD

Embodiments pertain to systems, methods, and component devices for wireless communications, and particularly user equipment capabilities.

BACKGROUND

Large varieties of user equipment (UE) devices may be used within a communication system. Many of these different devices have different capabilities based on the structure, circuitry, and configuration of a specific device. Embodiments described herein relate to such UEs signaling with network elements to establish UE capabilities that may be used for UE communications.

DETAILED DESCRIPTION

Embodiments relate to systems, devices, apparatus, assemblies, methods, and computer-readable media to enable communication systems with UE having varying capabilities, and system signaling to manage and activate sets of UE functionality during different operating conditions. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

Figure 1:
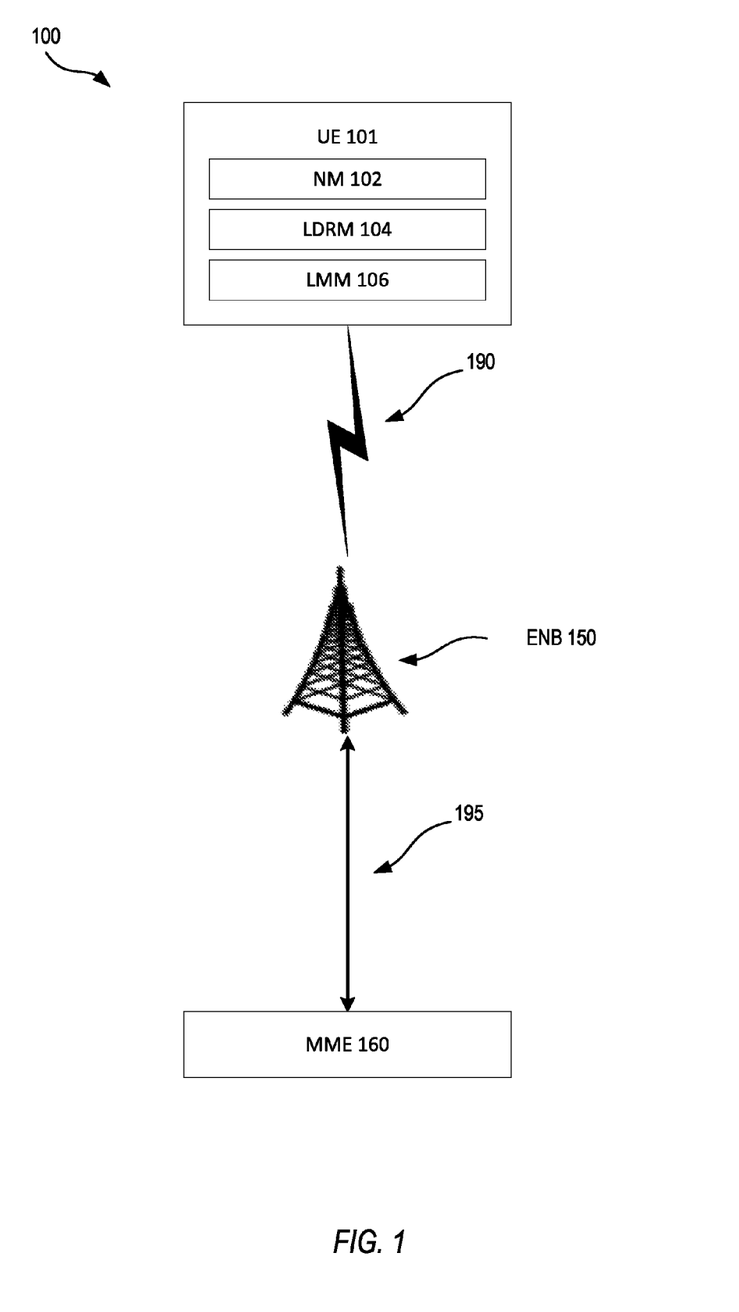
FIG. 1 illustrates a block diagram of a system including an evolved node B (eNB) and user equipment (UE) that may operate with a mobility management entity (MME), according to certain embodiments.

FIG. 1 illustrates a wireless network system 100, in accordance with some embodiments. The wireless network system 100 includes UE 101 and eNB 150 connected via air interface 190. The UE 101 and any other UE in the system 100 may be, for example, laptop computers, smart phones, tablet computers, printers, machine-type devices such as smart meters or specialized devices for healthcare monitoring, remote security surveillance, an intelligent transportation system, or any other wireless devices with or without a user interface. The eNB 150 provides network connectivity to a broader network (not shown) to UE 101 via air interface 190 in an eNB service area provided by eNB 150. Each eNB service area associated with eNB 150 is supported by antennas integrated with eNB 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of eNB 150, for example, includes three sectors each covering a 120-degree area with an array of antennas directed to each sector to provide 360-degree coverage around eNB 150. ENB 150 terminates the air interface 190 protocol and may be the first point of contact for a UE 101. In some embodiments, an eNB 150 may fulfill various logical functions for a radio area network including but not limited to radio resource management such as radio bearer management, uplink and downlink dynamic radio resource management and data packet scheduling, and mobility management. In accordance with embodiments, UE 101 may be configured to communicate communication signals such as orthogonal frequency division multiple access (OFDMA) signals or single carrier frequency division multiple access (SC-FDMA) signals with an eNB 150 over different channels in accordance with various communication techniques. The signals may comprise a plurality of orthogonal subcarriers. In other embodiments, this communication functionality may be carried out by other similar devices.

System 100 also includes mobility management entity (MME) 160 coupled to eNB 150 via communication link 195. Communication link 195 may be any wired or wireless communication link, or a combination of multiple links, to enable communications between MME 160 and eNB 150. While the above system 100 is described with respect to UE, eNB, and MME elements, it will be apparent that other systems having elements that perform similar functionality may operate in other embodiments.

In certain embodiments, for example, MME 160 may be similar in function to the control plane of a Serving General Packet Radio System (GPRS) Support Nodes (SGSN). The MME 160 manages mobility aspects in access such as gateway selection and tracking area list management as part of a broader system operation. In addition, an MME may be a local mobility anchor point for handovers between different eNBs. An MME may also provide an anchor for mobility between different portions of a third generation partnership project (3GPP) network. In some embodiments, MME 160 may be implemented in one physical node with a serving gateway or other elements of a network.

In cellular mobile communication systems such as 3GPP long term evolution (LTE), LTE-advanced, and Universal Mobile Telecommunications System (UMTS) networks, the UE 101 sends UE capabilities to the network if requested to do so by the network. In Access Stratum (AS), the set of UE capabilities includes all parameters related to radio access functionalities which are optional for the UE to implement. With the knowledge of the UE radio access capabilities, the network can properly configure the radio parameters for the operation of the UE in conjunction with functionality of the UE that is supported by the network. A UE capability transfer procedure is used, for example, in LTE during an initial attach procedure when the UE 101 registers with the network system 100 to receive services that use registration. When the MME 160 located in the core network accepts an attach request message received from UE 101, the MME 160 sends the eNB 150 an initial context setup request message containing an attach acceptance. Due to the initial context setup request message in LTE not containing any UE radio capability information, the eNB 150 then retrieves UE capability information from UE 101 by sending a UE capability enquiry message. With the UE capability enquiry message, eNB 150 can request UE 101 to send UE capability information for a particular radio access technology (e.g., evolved universal mobile telecommunications system (UMTS) terrestrial radio access (e-UTRA), global system for mobile communications (GSM) enhanced data rate for GSM evolution (EDGE) radio access networks (GERAN), etcetera). The UE 101 then sends a radio capability message for the requested technologies to the eNB 150. ENB 150 then forwards the UE radio capabilities to MME 160 using the UE capability information indication message. The MME 160 stores the received UE radio capabilities for further provisioning as needed.

In UMTS, a similar initial UE capability transfer can be requested by a UMTS radio access network by sending a UE capability enquiry or radio resource control (RRC) connection setup message to a UE. A UE may then communicate its capabilities via a RRC connection setup complete or UE capability information message.

Beginning in 3GPP release 11 (3GPP SP-59 published Mar. 6, 2013) and in later releases, an eNB may request LTE capabilities from a UE for a number of requested LTE frequency bands to minimize carrier aggregation (CA) signaling for band combinations supported by the UE. In certain embodiments, the size of UE capabilities may be very large (e.g., consume significant signaling resources) depending on the UE implementation. Table 1, below, illustrates UE capability size evaluation for a multiple radio access technology UE operating in conjunction with 3GPP release 9 (3GPP SP-47, Mar. 25, 2010).

TABLE 1

| Number of LTE bands, N | UE Capability Size (bytes) |
| --- | --- |
| 6 | 92 |
| 12 | 131 |
| 18 | 175 |
| 24 | 229 |
| 27 | 259 |

Some embodiments include a storage limitation of 510 octets with regard to the accepted size of UE capability information an MME is structured to store. In such embodiments, this limit applies for the UE capabilities of all technologies that the UE supports. Many possible UE devices, however, may have capabilities which exceed such storage limits. Embodiments described herein include a benefit of enabling operating modes where certain features and functionalities of a UE are limited, both to extend battery life or system throughput operation in addition to limiting the capability information size to within the MME limits.

Embodiments described herein therefore use definitions of temporary operating modes for a UE along with flexible UE capability information setting and transfer depending on a current operating mode. UE 101 of FIG. 1 illustrates UE 101 with any combination of firmware, software, and circuitry to implement modes 102, 104, and 106.

Normal mode (NM) 102 comprises an operating mode of UE 101 where all available capabilities are configured as available in the network when supported and compatible with MME 160.

Low data rate mode (LDRM) 104 comprises an operating mode of UE 101 for power saving operations and extended battery life with limited operations. In one embodiment, for example, only low data rate categories 1, 2, 3, or 4 as described by 3GPP releases are supported by low data rate mode 104. In other embodiments, other combinations of low data rate operations are supported. In some embodiments, support for inter-radio access technology and radio frequency band capabilities is limited, for instance, by signaling with a limited number of bands. In still further embodiments of low data rate mode 104, carrier aggregation and multiple input-multiple output functionalities are not supported. UE capabilities signaled to an MME via an eNB in such a low data rate mode 104 will therefore not include certain functionalities in any list of UE capabilities.

Limited mobility mode (LMM) 106 may work in conjunction with sensors, such as sensors 828 (FIG. 8) or a system identification or setting, to identify that UE 101 is stationary. Some devices, such as internet protocol surveillance cameras, routers, or fixed sensors, may be identified by a system as stationary UEs. Such devices may operate in a limited mobility mode 106 which supports any data rate, but which may include capabilities which are limited to match the capabilities of a serving cell. Embodiments of limited mobility mode 106 may thus exclude inter-radio access technology functionality, self-optimizing network capability, and minimization of drive test (MDT) capability. In other embodiments, UE 101 may identify throughput capabilities of eNB 150, and may dynamically set temporary UE capability information for limited mobility mode 106 based on a match between throughput needs and capability of UE 101 and matching capability of the cell providing network access in conjunction with eNB 150. Thus, limited mobility mode 106 may also provide a limited list of UE capabilities as part of UE capability information that is less than all the available capability of the UE 101.

Once an operating mode is identified and selected, flexible UE capability information transfer may then be used to set capability for the UE 101 within the wireless network system 100. The UE 101 is able to indicate during a connection setup procedure what temporary operating mode the UE 101 is selected to operate in. This indication is communicated to a network and the MME 160 to update device operation within the system 100.

Figure 2:
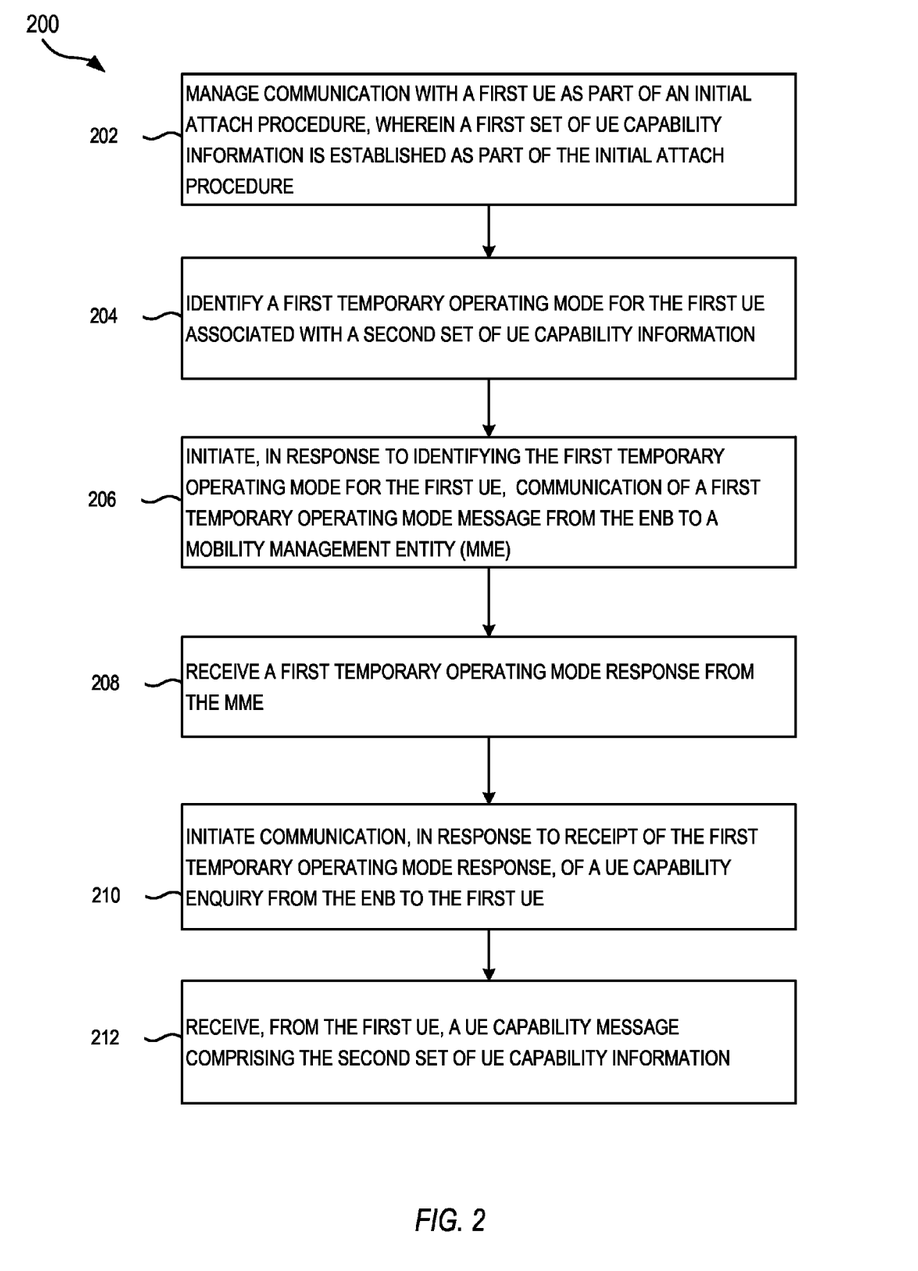
FIG. 2 illustrates an example method performed by an eNB for capability information setting according to certain embodiments.

FIG. 2 then illustrates an example method 200 that may be performed by an eNB for capability information setting according to certain embodiments. Method 200 involves an eNB or an apparatus of an eNB for UE radio capability signaling. For the purposes of illustration, method 200 is described in the context of eNB 150, UE 101, and MME 160, but it will be apparent that method 200 and equivalent methods may be performed by various devices in different wireless communication systems. In some embodiments, the method 200 may be performed exclusively by one or more integrated circuits of an eNB, such as a baseband processor or another such apparatus. In other embodiments, multiple such elements of an eNB may perform method 200 working together. In various embodiments, non-transitory computer-readable media or memory modules may be used to store instructions that configure an eNB, or processors, modules, or apparatus of the eNB to perform method 200.

The example method 200 of FIG. 2 begins with operation 202, which involves managing, using circuitry of the UE 101 apparatus, communication with a first UE 101 as part of an initial attach procedure. A first set of UE capability information is established as part of the initial attach procedure. Such a first set of UE capability information may be associated with a first temporary operating mode in an initial attachment, or a UE can select to operate in a temporary operating mode, which may be a normal mode, for example. Such an initial attach procedure may be a standard LTE attach procedure as described above, or may be any other attach procedure which provides initial UE capability information. In other embodiments, other initial attach procedures may be used.

Operation 204 then involves identifying, using the circuitry the first UE 101, a first temporary operating mode for the first UE 101 associated with a second set of UE capability information. As discussed above, examples of such temporary operating modes include a low mobility mode 106, low data rate mode 104, and normal mode 102. The term "temporary operating mode" as used herein does not necessarily mean that the operating time is limited, but is an indication that the operating mode may be changed at the initiation of the UE 101, the MME 160, or any other network element authorized to set the operating mode of the UE 101. The temporary operating modes are thus modes that identify different subsets of UE 101 capabilities to a network, where the temporary operating modes may be switched so that a single UE can operate in a different mode at different times with different subsets of the UE's capabilities active.

Operation 206 involves initiating communication, using the circuitry, in response to identifying the first temporary operating mode for the first UE 101, of a first temporary operating mode message from the eNB 150 to the MME 160. Operation 208 involves receiving, at the apparatus of the eNB 150, a first temporary operating mode response from the MME 160, and operation 210 involves initiating communication by the circuitry of eNB 150, in response to receipt of the first temporary operating mode response, of a UE capability enquiry from the eNB 150 to the first UE 101. Such temporary operating mode messages and responses need not be new types of messages, but may be an indication within a message type that is previously defined or used within a system. Operation 212 involves receiving, at the apparatus of the eNB 150 from the first UE 101, a UE capability message comprising the second set of UE capability information.

In addition to the method 200, which is a method performed by an eNB or one or more apparatus components of an eNB, corresponding methods performed by a UE, such as UE 101 or an MME such as MME 160, are also embodiments. Further still, operations of any such embodiment of a method performed by a UE, an eNB, or an MME may include intervening steps, may be performed together, or may have operations performed in different orders in accordance with other embodiments.

Figure 3:
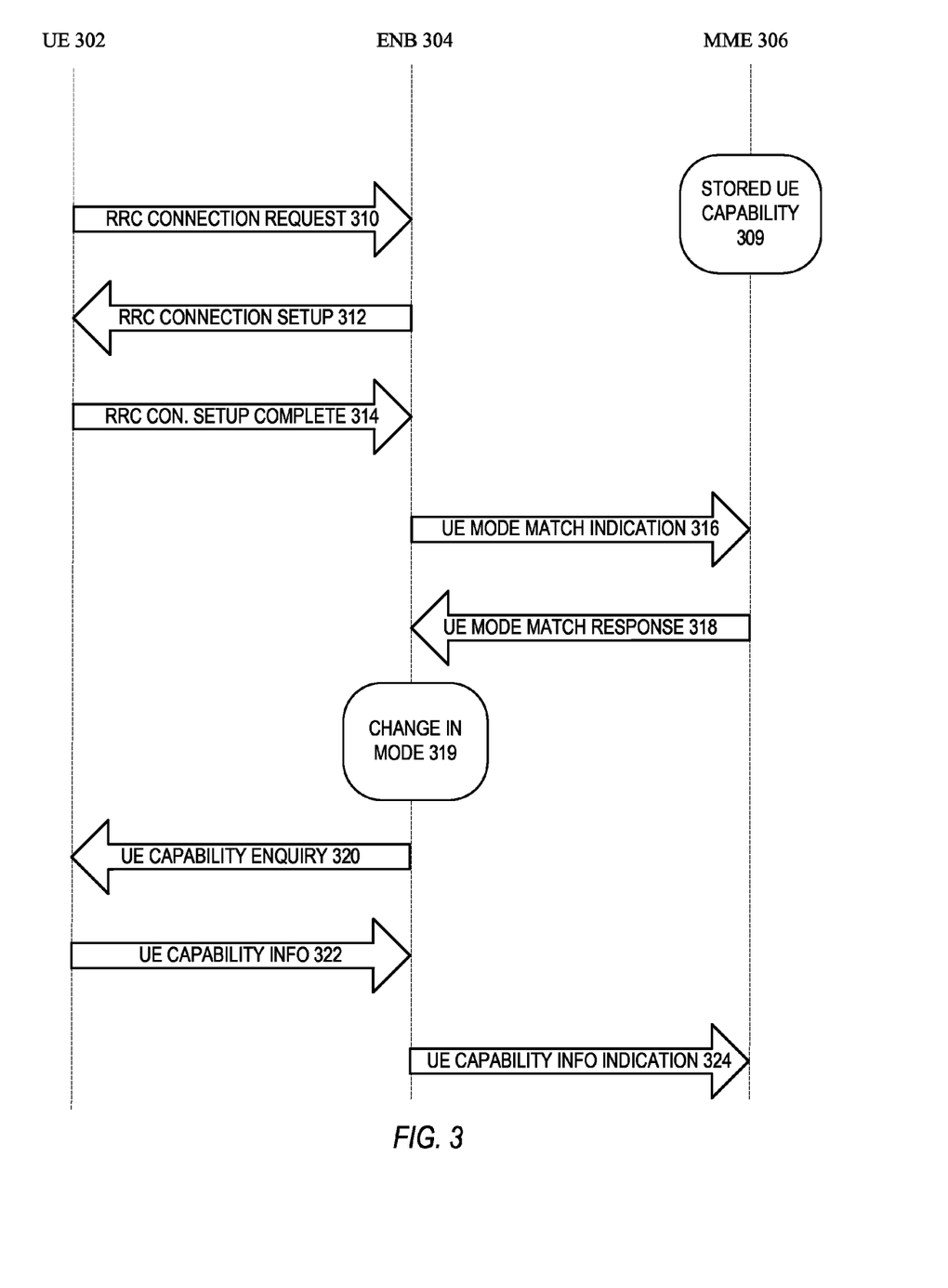
FIG. 3 illustrates an example of signaling UE radio capability information in accordance with some embodiments.
Figure 4:
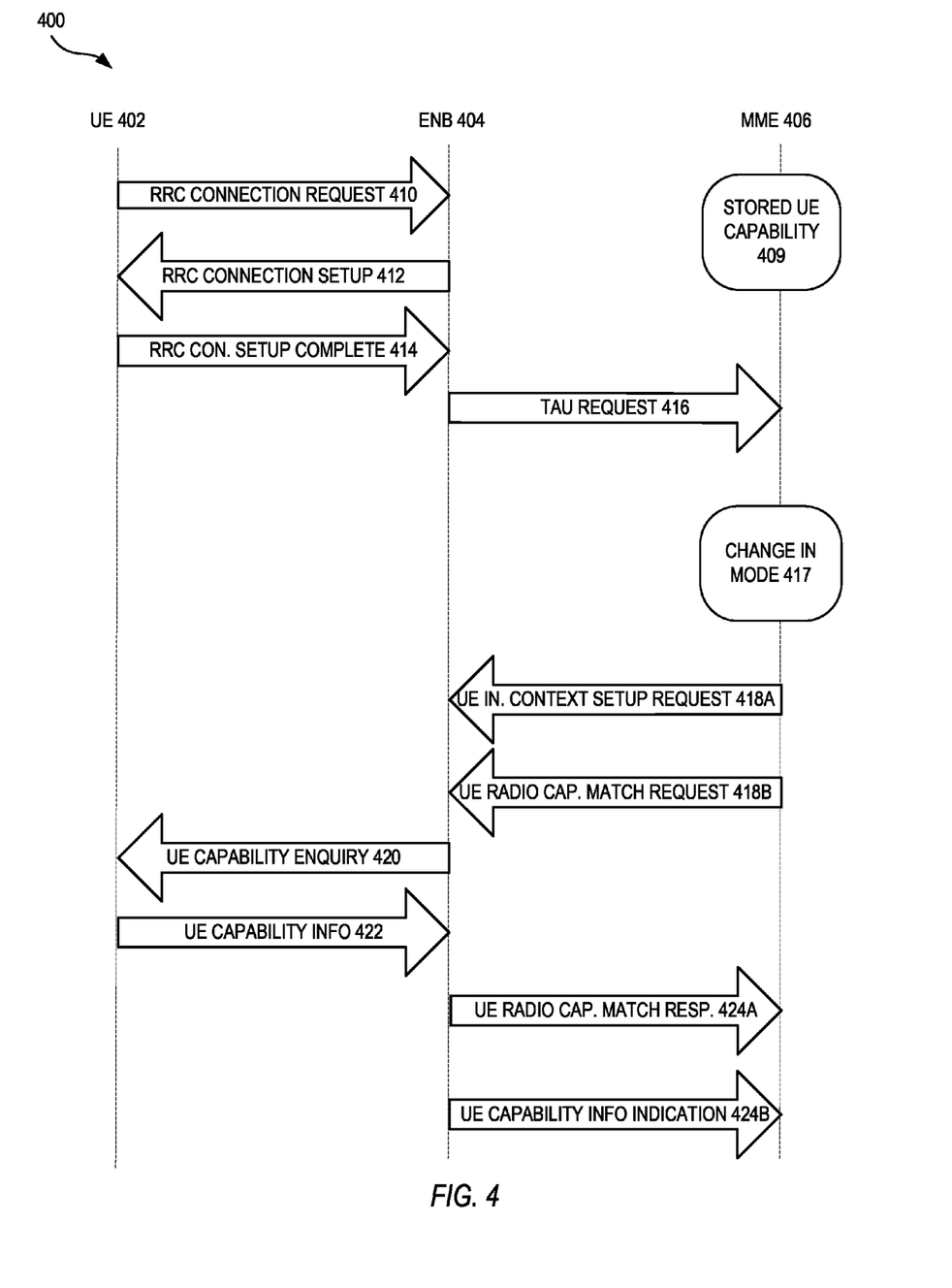
FIG. 4 illustrates an example of signaling UE radio capability information in accordance with some embodiments.

FIGS. 3 and 4 then describe two additional embodiments of system operation to set UE operating modes with UE radio capability signaling. FIG. 3 illustrates an example of signaling UE radio capability information in a system including UE 302, eNB 304, and MME 306 in accordance with some embodiments. As illustrated by FIG. 3, UE capability is initially stored in MME 306. This capability may correspond to a normal operating mode, or to any operating mode that has been used previously in communication with MME 306 from UE 302. An initial connection setup occurs with radio resource control (RRC) connection request 310 sent from UE 302 to eNB 304, and an RRC connection setup 312 sent to UE 302 from eNB 304 in response. RRC connection setup complete 314 is then sent from UE 302 to eNB 304. The RRC connection setup complete 314 message includes an indication that the UE 302 is selecting to operate in a temporary operating mode. For example, in one embodiment, RRC connection setup complete 314 message may indicate that UE 302 is selecting a low data rate operating mode.

In response to RRC connection setup complete 314 including the temporary operating mode selection, eNB 304 initiates UE mode match indication 316. This UE mode match indication 316 may operate to determine if MME 306 includes already stored information in MME 306 according to the selected temporary operating mode from RRC connection setup complete 314. MME 306 then compares the stored operating mode to the temporary operating mode, and responds with UE mode match response 318. A change in the temporary operating mode 319 is then detected at eNB 304. If, for example, MME 306 has capabilities for a normal operating mode stored from a previous initial setup or initial attach procedure, and the UE 302 is requesting a low data rate operating mode, the UE mode match response 318 will indicate that it has capability information stored for the normal mode, and not the low data rate mode. This information about any existing capability previously stored in MME 306 is sent to eNB 304, and eNB 304 requests a list or other information about the requested temporary operating mode in UE capability enquiry 320. The UE 302 responds with UE capability information 322 identifying the subset of operating capabilities associated with the selected temporary operating mode, and this information is sent to MME 306 for storage and use as part of UE capability information indication 324.

UE 302 will then operate in conjunction with MME 306 using the capabilities identified in UE capability information 322 and UE capability information indication 324 until the capabilities are later updated to a new operating mode in another version of the above procedure. As such, in one embodiment, MME 306 begins with a first set of capabilities stored, and updates the capabilities associated with UE 302 to a second set of capabilities which replace the first set of capabilities in accordance with any update procedure described herein. UE 302 then interacts with MME 306 using the second set of capabilities until MME 306 is updated with a third set of capabilities. The third set of capabilities may be different than the second set of capabilities but the same as the first set of capabilities, or may be different than both the first and second sets of capabilities. In some embodiments, for example, the first set of capabilities may be part of a normal operating mode, the second set of capabilities may be a subset of the first set of capabilities as part of a low throughput mode, and the third set of capabilities may be a second different subset of the first set of capabilities as part of a stationary mode.

FIG. 4 then illustrates another example of signaling UE radio capability information in accordance with some embodiments. FIG. 4 involves communication between UE 402, eNB 404, and MME 406, which may be similar to UEs 302 and 101, eNBs 304 and 150, and MMEs 306 and 160. A previous attachment to MME 406 identifying a first set of operating characteristics has previously occurred to generate stored UE capability 409 in MME 406. Similar to the signaling of FIG. 3, FIG. 4 begins with RRC connection requests and responses with RRC connection request 410, RRC connection setup 412, and RRC connection setup complete 414, where RRC connection setup complete 414 identifies a temporary operating mode requested by UE 402 to eNB 404. In some embodiments, this may be done by piggybacking a tracking area update (TAU) request to the RRC connection setup complete 414 message with an identifier for the temporary operating mode attached.

ENB 404 is able to identify a temporary operating mode requested by UE 402 from RRC connection setup complete 414. ENB 404 then initiates, in response to identifying the first temporary operating mode, a TAU request 416 message communication to MME 406. This may, in some embodiments, a forwarding of a piggybacked TAU request to the MME. In FIG. 4, the identification of the temporary operating mode is performed in the MME 406, in contrast to FIG. 3. MME 406 analyzes the TAU request 416 and identifies that a change in mode 417 associated with UE 402 has been requested. In some embodiment, this involves analyzing a temporary operating mode identifier from the TAU. Based on this identification, MME 406 triggers a retrieval of UE 402 information via eNB 404. MME 406 may also delete the existing stored UE capability 409 in response to TAU request 416.

The retrieval of UE 402 information associated with the temporary operating mode requested by TAU request 416 may occur either by a UE initial context setup request 418A, or by a UE radio capability match request 418B. Regardless of which type of request is used, eNB 404 receives the request 418A or 418B, and sends UE capability enquiry 420 in response. UE 402 sends the requested UE capability information 422 identifying the capabilities associated with the requested temporary operating mode. Then, depending on which request was used between UE initial context setup request 418A and UE radio capability match request 418B, eNB 404 will respond with a corresponding response: either UE radio capability match response 424A or UE capability information indication 424B. This response will include new UE capability for storage in MME 406 to replace stored UE capability 409. In some embodiments, this initial information may simply be overwritten or deleted at the time the new information is received rather than deletion when TAU request 416 is received at MME 406.

Just as described above, in various additional embodiments, other signaling may be used in accordance with alternate embodiments. For example, in some embodiments, where UE initial context setup request 418A is used and TAU request 416 includes a list of UE characteristics for UE 402, UE radio capability match response 424A may be optional, with stored UE capability 409 replaced with information received as part of TAU request 416. In other embodiments, various combinations of operations described herein or rearrangement of operations may be implemented.

Figure 5:
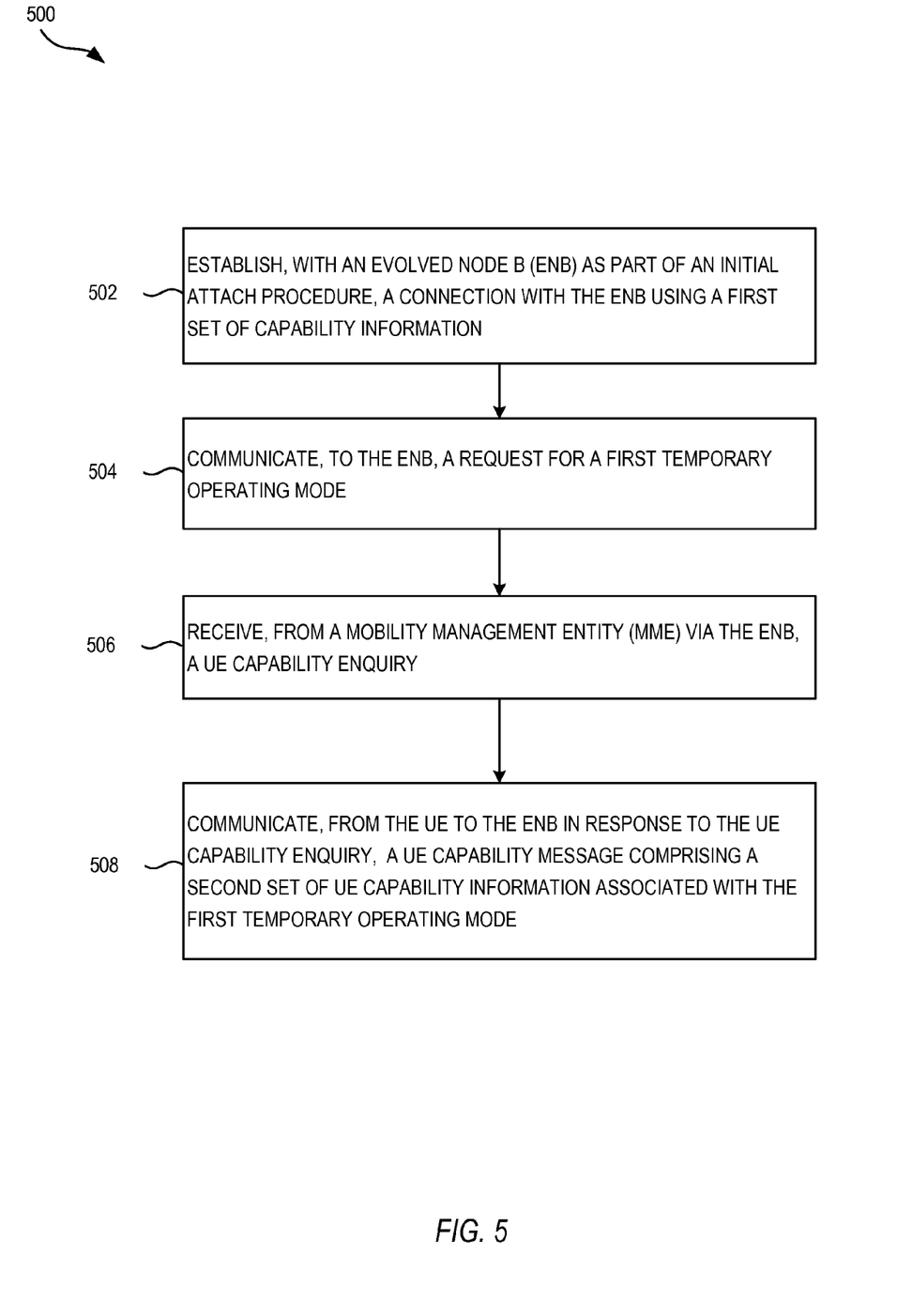
FIG. 5 illustrates an example method performed by a UE for capability information setting according to certain embodiments.

FIG. 5 illustrates an example method performed by a UE for capability information setting according to certain embodiments. In some embodiments, method 500 may be performed by a UE such as UE 101 while a corresponding eNB 150 is performing method 200. In other embodiments, method 500 may be used as part of signaling operations described in FIGS. 3 and 4 and performed by corresponding UE 302 or 402. In various embodiments, non-transitory computer readable media or memory modules may be used to store instructions that configure a UE or processors or modules of the UE to perform method 500.

Method 500 begins with operation 502 establishing, using one or more processors or apparatus of a UE in communication with an evolved node B (eNB) as part of an initial attach procedure, a connection with the eNB using a first set of capability information. As mentioned above with respect to method 200, this may be associated with a first temporary operating mode that may, for example, be a normal operating mode. The UE then communicates to the eNB, in operation 504, a request for a first temporary operating mode. As described above, this may be a message included with an RRC connection setup complete such as a piggybacked TAU, or may be some other message. The UE then receives, from an MME via the eNB, a UE capability enquiry as part of operation 506. At operation 508, in response to the UE capability enquiry, the UE communicates to the eNB, in response to the UE capability enquiry, a UE capability information message comprising a second set of UE capability information associated with the first temporary operating mode.

Figure 6:
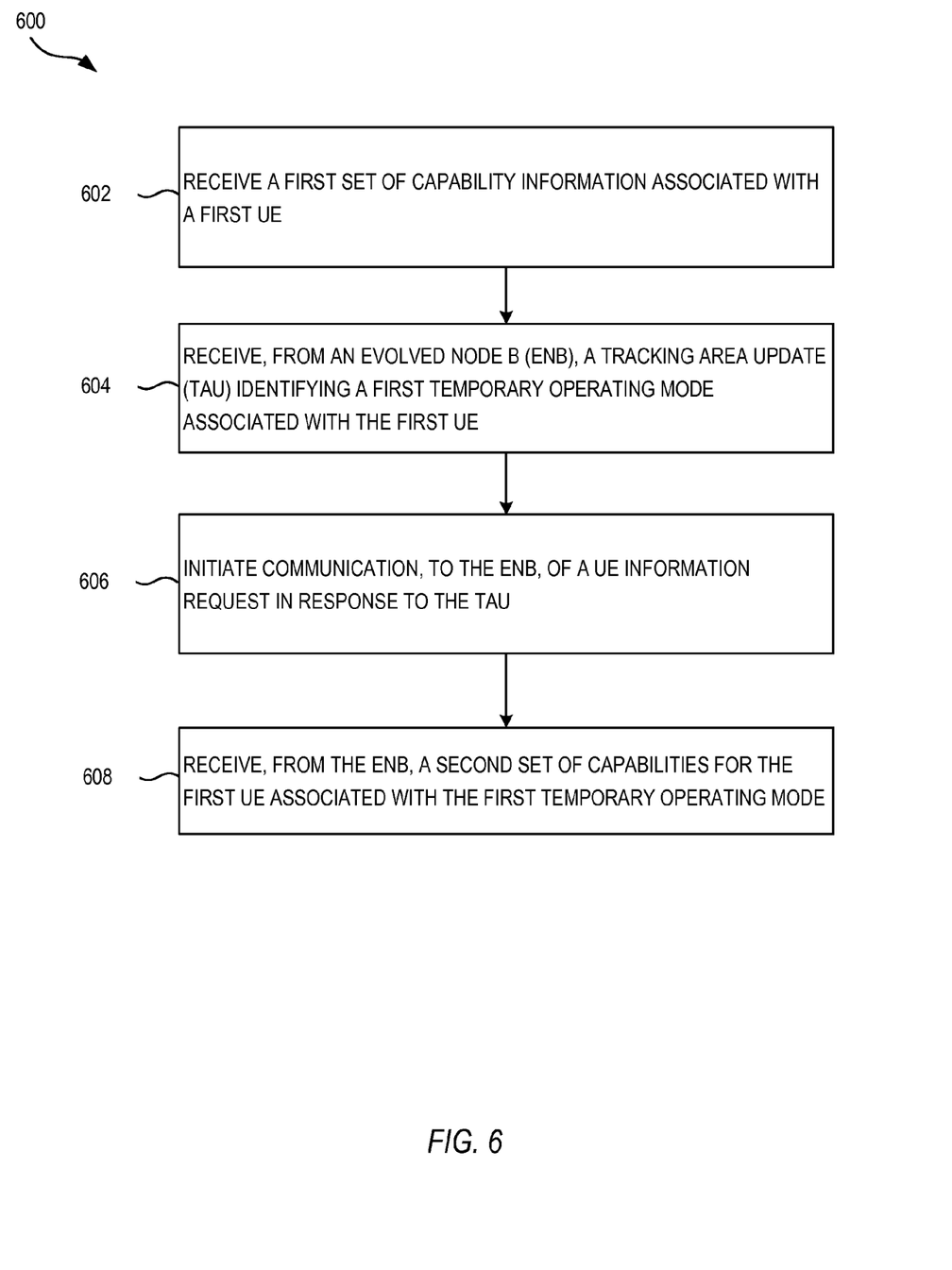
FIG. 6 illustrates an example method performed by an MME for capability information setting according to certain embodiments.

FIG. 6 then similarly illustrates an example method performed by an MME for capability information setting according to certain embodiments. In some embodiments, method 600 may be performed by an MME such as MME 160 while a corresponding eNB 150 is performing method 200 and UE 101 is performing method 500. In other embodiments, method 600 may be used as part of signaling operations described in FIG. 3 or 4 and performed by corresponding devices. In various embodiments, non-transitory computer-readable media or memory modules may be used to store instructions that configure a MME, one or more processors of an MME, or one or more apparatus of an MME to perform method 600.

Method 600 includes operation 602 where the MME receives a first set of capability information associated with a first UE. As mentioned above for other methods, this may be associated, in some embodiments, with a first temporary operating mode for a normal mode. In other embodiments this may be associated with other operating modes. In operation 604, the MME then receives, from an evolved node B (eNB), a tracking area update (TAU) identifying a first temporary operating mode associated with the first UE. In operation 606, the MME then initiates communication to the eNB of a UE information request in response to the TAU. In operation 608, the MME receives, from the eNB, a second set of capabilities for the first UE associated with the first temporary operating mode.

As described above, in other embodiments, the operations described above may be used in different ways, and may include intermediate operations or other groupings of operations. For example, in some embodiments, operations 604 and 608 may be part of the same operation when the TAU includes the second set of capabilities. In such an embodiment, the first set of capabilities stored by the MME may be deleted and replaced upon receipt of the second set of capabilities. The UE associated with the capabilities and the MME may then continue to operate and communicate using normal operations with the capabilities of the current temporary operating mode until a new temporary operating mode is selected.

Embodiments described above include a number of benefits in certain implementations. In some embodiments, the maximum size of the UE radio capability information, such as stored UE capability 409, can be restricted to a certain limit, as temporary operating modes may be set to conform with this limit regardless of the actual operating characteristics of an individual UE. Some embodiments enable one or more UE associated with an MME to switch configurations seamlessly to suit the operating environment of the UE, compared with complex manual or static operating mode selection or attach/reattach procedures that result in the release of an RRC connection and establishment of a new RRC connection for a new operating mode. Some embodiments may additionally use a software administrative agent to intelligently decide the most suitable configuration, and may trigger temporary operating mode changes based on sensor data, software use tracking, user interface inputs, or other context analysis.

The embodiments described herein may then be used to transition to different temporary operating modes in a variety of circumstances. For example, a UE in an out-door location with a user on a trip and away from a power source for an extended time with minimum data use may switch to a low data rate mode. A machine-to-machine tracking device attached to a shipping container may switch to a limited mobility mode while stored in a shipment terminal, and may automatically change modes when moving, with the movement detected by location systems of the UE or other location systems as part of a network.

Example 1 comprises an apparatus of an evolved node B (eNB) for user equipment (UE) radio capability signaling. As mentioned above, such an apparatus may be an integrated circuit, an assembly including multiple integrated circuits, or another element of the eNB described below. The apparatus comprises circuitry configured to manage, using the circuitry, communication with a first UE as part of an initial attach procedure, where a first set of UE capability information is established as part of the initial attach procedure; identify, using the circuitry, a first temporary operating mode for the first UE associated with a second set of UE capability information; initiate communication using the circuitry, in response to identifying the first temporary operating mode for the first UE, of a UE mode match indication message from the eNB to a mobility management entity (MME); receive, at the apparatus of the eNB, a UE mode match response from the MME; initiate communication by the circuitry, in response to receipt of the first temporary operating mode response, of a UE capability enquiry from the eNB to the first UE; and receive, at the apparatus of the eNB from the first UE, a UE capability message comprising the second set of UE capability information.

Example 2 is an additional implementation of example 1 where the circuitry is further configured to identify, by the eNB from the first temporary operating mode response, a change in operation mode for the UE, and where communication of the UE capability enquiry from the eNB to the first UE is further initiated in response to the identification of the change in operating mode for the UE.

Example 3 is an additional implementation of examples 1 and 2 structured where the first set of UE capability information is associated with a normal operating mode where all capabilities configured in the first UE are available for use, and where the first set of UE capability information comprises a list of all capabilities of the first UE.

Example 4 is an additional implementation of any of examples 1 through 3 structured where the second set of UE capability information is associated with a low data rate operating mode where a set of capabilities configured in the first UE are limited for power saving operation.

Example 5 is an additional implementation of any of examples 1 through 4 structured where the second set of UE capability information comprises a list of capabilities of the first UE limiting inter-radio access technology (RAT) and radio frequency (RF) band capabilities.

Example 6 is an additional implementation of any of examples 1 through 5 structured where the second set of UE capability information comprises a list of capabilities of the first UE excluding carrier aggregation (CA) and multiple input multiple output (MIMO) capabilities.

Example 7 is an additional implementation of any of examples 1 through 6 structured where the second set of UE capability information is associated with a low mobility operating mode.

Example 8 is an additional implementation of any of examples 1 through 7 structured where the second set of UE capability information comprises a list of capabilities of the first UE where RF band capabilities of the list of capabilities of the first UE exclude RF band capabilities of the first UE not shared with the eNB.

Example 9 is an additional implementation of any of examples 1 through 8 structured where the second set of UE capability information further excludes minimization of drive test (MDT) and self-optimizing network (SON) capabilities of the first UE.

Example 10 is an additional implementation of any of examples 1 through 9 structured where the circuitry configured to manage communication with the first UE as part of the initial attach procedure comprises circuitry configured to: receive an attach request from the first UE; communicate the attach request to the MME; receive an initial context setup request from the MME; communicate an initial UE capability enquiry to the first UE; receive the first set of UE capability information from the UE in response to the initial UE capability enquiry; and communicate the first set of UE capability information to the MME.

Example 11 is an additional implementation of any of examples 1 through 10 structured where the first temporary operating mode for the first UE is identified from a radio resource control (RRC) connection setup complete message received by the apparatus; where the UE mode match indication message comprises a first temporary operating mode; and where the UE mode match response comprises a stored temporary operating mode of the UE.

Example 12 is an additional implementation of any of examples 1 through 11 structured where the first temporary operating mode message comprises a tracking area update (TAU) message, and where the first temporary operating mode response from the MME comprises a UE initial context setup request.

Example 13 is an additional implementation of any of examples 1 through 12 structured where the first temporary operating mode is identified within the TAU message.

Example 14 is an additional implementation of any of examples 1 through 13 structured where the first temporary operating mode message comprises a tracking area update (TAU) message; and where the first temporary operating mode response from the MME comprises a UE radio capability match request.

Example 15 is an additional implementation of any of examples 1 through 14 structured with an antenna coupled to the circuitry, where the antenna is configured for communication with the first UE via an air interface.

Example 16 is a non-transitory computer-readable medium comprising instructions that, when executed by one or more processors of an evolved node B (eNB), configure the eNB to: manage communication with a first user equipment (UE) as part of an initial attach procedure, where a first set of UE capability information is established as part of the initial attach procedure; identify, a first temporary operating mode for the first UE associated with a second set of UE capability information; initiate communication, in response to identifying the first temporary operating mode for the first UE, of a first temporary operating mode message from the eNB to a mobility management entity (MME); receive a first temporary operating mode response from the MME; initiate, in response to receipt of the first temporary operating mode response, communication of a UE capability enquiry from the eNB to the first UE; and receive, from the first UE, a UE capability information message comprising the second set of UE capability information.

Example 17 is a method comprising: transmitting, from a UE, an indication message including an indication to a network entity about a mode of operation; receiving, by the UE in response to the transmitting the indication message, an enquiry message from the network entity, the enquiry message including a request for the UE to transfer an indication of a set of radio capabilities of the UE in accordance with an indicated mode of operation; processing, by the UE, the enquiry message to determine the set of radio capabilities of the UE to transfer in accordance with the indicated mode of operation; and transmitting, from the UE, a response message to the network entity that includes the indication of the set of radio capabilities of the UE in accordance with the indicated mode of operation. Such an embodiment may operate wherein the network entity is an evolved NodeB (eNB), a Mobility Management Entity (MME), a Radio Network Controller (RNC), or a Serving Gateway Support Node (SGSN).

Example 18 is an additional implementation of example 17 that includes user equipment (UE) comprising: transmitter circuitry to: transmit an indication message including an indication to a network entity about a mode of operation; and transmit, in response to an enquiry message, a response message to the network entity that includes an indication of a set of radio capabilities of the UE in accordance with the indicated mode of operation; receiver circuitry coupled with the transmitter circuitry, the receiver circuitry to receive, in response to a transmission of the indication message, the enquiry message from the network entity, the enquiry message including a request for the UE to transfer the indication of a set of radio capabilities of the UE in accordance with an indicated mode of operation; and control circuitry coupled with the transmitter circuitry and the receiver circuitry, the control circuitry to process the enquiry message to determine the set of radio capabilities of the UE to transfer in accordance with the indicated mode of operation.

Example 19 is method comprising: receiving, by an evolved NodeB (eNB) from a user equipment (UE), an indication message including an indication about a mode of operation; transmitting, by the eNB in response to the indication message, an enquiry message that includes a request to the UE to transfer an indication of a set of radio capabilities of the UE in accordance with an indicated mode of operation; and receiving, by the eNB from the UE, a response message that includes the indication of the set of radio capabilities of the UE in accordance with an indicated mode of operation.

Example 20 is an evolved NodeB (eNB) comprising: transmitter circuitry to transmit, in response to an indication message, an enquiry message that includes a request to a user equipment (UE) to transfer an indication of a set of radio capabilities of the UE in accordance with an indicated mode of operation; and receiver circuitry coupled with the transmitter circuitry, the receiver circuitry to: receive, from the UE, the indication message that includes an indication about a mode of operation; and receive, from the UE, a response message that includes the indication of the set of radio capabilities of the UE in accordance with an indicated mode of operation.

Example 21 is a method comprising: receiving, by a mobility management entity (MME), an indication message including an indication about a mode of operation; transmitting, by the MME in response to the indication message, an enquiry message that includes a request to a user equipment (UE) to transfer an indication of a set of radio capabilities of the UE in accordance with an indicated mode of operation; and receiving, by the MME, a response message that includes the indication of the set of radio capabilities of the UE in accordance with an indicated mode of operation. An additional implementation may further include identifying, by the MME based on the indication about the mode of operation, whether the set of radio capabilities of the UE that is stored at the MME are different from the indicated mode of operation; and triggering, by the MME if the set of radio capabilities of the UE that is stored in the MME is different from the indicated mode of operation, deletion of the set of radio capabilities of the UE that is stored in the MME and retrieving new radio capabilities of the UE according to the indicated mode of operation.

Example 22 is a mobility management entity (MME) comprising: transmitter circuitry to transmit, in response to an indication message, an enquiry message that includes a request to a user equipment (UE) to transfer an indication of a set of radio capabilities of the UE in accordance with an indicated mode of operation; and receiver circuitry coupled with the transmitter circuitry, the receiver circuitry to: receive an indication message including an indication about a mode of operation; and receive a response message that includes the indication of the set of radio capabilities of the UE in accordance with an indicated mode of operation. Some embodiment may operate further comprising: control circuitry coupled to the transmitter circuitry and the receiver circuitry, the control circuitry to identify, based on the indication about the mode of operation, whether the set of radio capabilities of the UE that is stored at the MME are different from the indicated mode of operation; and trigger, if the set of radio capabilities of the UE that is stored in the MME is different from the indicated mode of operation, deletion of the set of radio capabilities of the UE that is stored in the MME and retrieving new radio capabilities of the UE according to the indicated mode of operation.

Example 23 is method comprising: sending, from a UE, a message including an indication to a network entity about a mode of operation; receiving, by the UE in response to the sending the message, an enquiry message from the network entity that requests the UE to transfer the set of its radio capabilities in accordance with an indicated mode of operation; processing, by the UE, the enquiry message from the network entity to determine the set of its radio capabilities to transfer in accordance with an indicated mode of operation; and sending, from the UE, a response message to the network entity that includes the set of its radio capabilities in accordance with an indicated mode of operation. One such embodiment may operate where the indication of the mode of operation is sent by UE in a Routing Area Update Request message to the Serving Gateway Support Node (SGSN). In some embodiments the Routing Area Update Request message may be relayed over a Radio Network Controller (RNC) to the SGSN Example 24 is an additional implementation of any example 23 structured where the first temporary operating mode message comprises a UE mode match indication message; and where the first temporary operating mode response comprises a UE mode match response.

Example 25 is an additional implementation of any of examples 23 through 24 structured where the eNB identifies a change in mode for the UE based on the UE mode match response; and where the UE capability enquiry is further initiated based on the identification of the change in mode for the UE.

Example 26 is an additional implementation of any of examples 23 through 25 structured where the eNB receives an indication of a change in mode for the UE in the UE mode match response based on an identification of the change in mode by the MME; and where the UE capability enquiry is further initiated based on the indication of the change in mode in the UE mode match response.

Example 27 is an apparatus of a user equipment (UE) for UE radio capability signaling, the apparatus comprising circuitry configured to: establish, in communication with an evolved node B (eNB) as part of an initial attach procedure, a connection with the eNB using a first set of capability information; communicate, to the eNB, a request for a first temporary operating mode; receive, from a mobility management entity (MME) via the eNB, a UE capability enquiry; and communicate, from the UE to the eNB in response to the UE capability enquiry, a UE capability information message comprising a second set of UE capability information associated with the first temporary operating mode.

Example 28 is an additional implementation of example 27 structured where the circuitry is further configured to: communicate, to the eNB, a request for a second temporary operating mode; receive, from the MME via the eNB, a second UE capability enquiry; and communicate, from the UE to the eNB in response to the second UE capability enquiry, a second UE capability information message comprising a third set of UE capability information associated with the second temporary operating mode; where the first set of UE capability information, the second set of UE capability information, and the third set of UE capability information each identifies a different set of capabilities for the first UE.

Example 29 is an apparatus of a mobility management entity (MME) for user equipment (UE) radio capability signaling, the apparatus comprising circuitry configured to: receive a first set of capability information associated with a first UE; receive, from an evolved node B (eNB), a tracking area update (TAU) identifying a first temporary operating mode associated with the first UE; initiate communication to the eNB of a UE information request in response to the TAU; and receive, from the eNB, a second set of capability information for the first UE associated with the first temporary operating mode.

Example 30 is an additional implementation of example 29 structured where the circuitry is further configured to: identify, from the TAU, a change in operating mode for the UE; and where the UE information request is further initiated in response to the identification of the change in operating mode.

Example 31 is an additional implementation of any of examples 29 through 30 structured where the UE information request comprises a UE initial context setup request.

Example 32 is an additional implementation of any of examples 29 through 31 be structured where the UE information request comprises a UE radio capability match request.

In addition to the various embodiments described above and throughout the present description, it will be apparent that additional embodiments are possible within the scope of the description of the claims, and that elements of the embodiments described above may be reconfigured in various ways to present additional embodiments not specifically described herein. For example, not every possible combination of the examples discussed above are specifically presented, and it will be apparent that additional examples may be created from combinations of the elements of the examples presented above.

Figure 7:
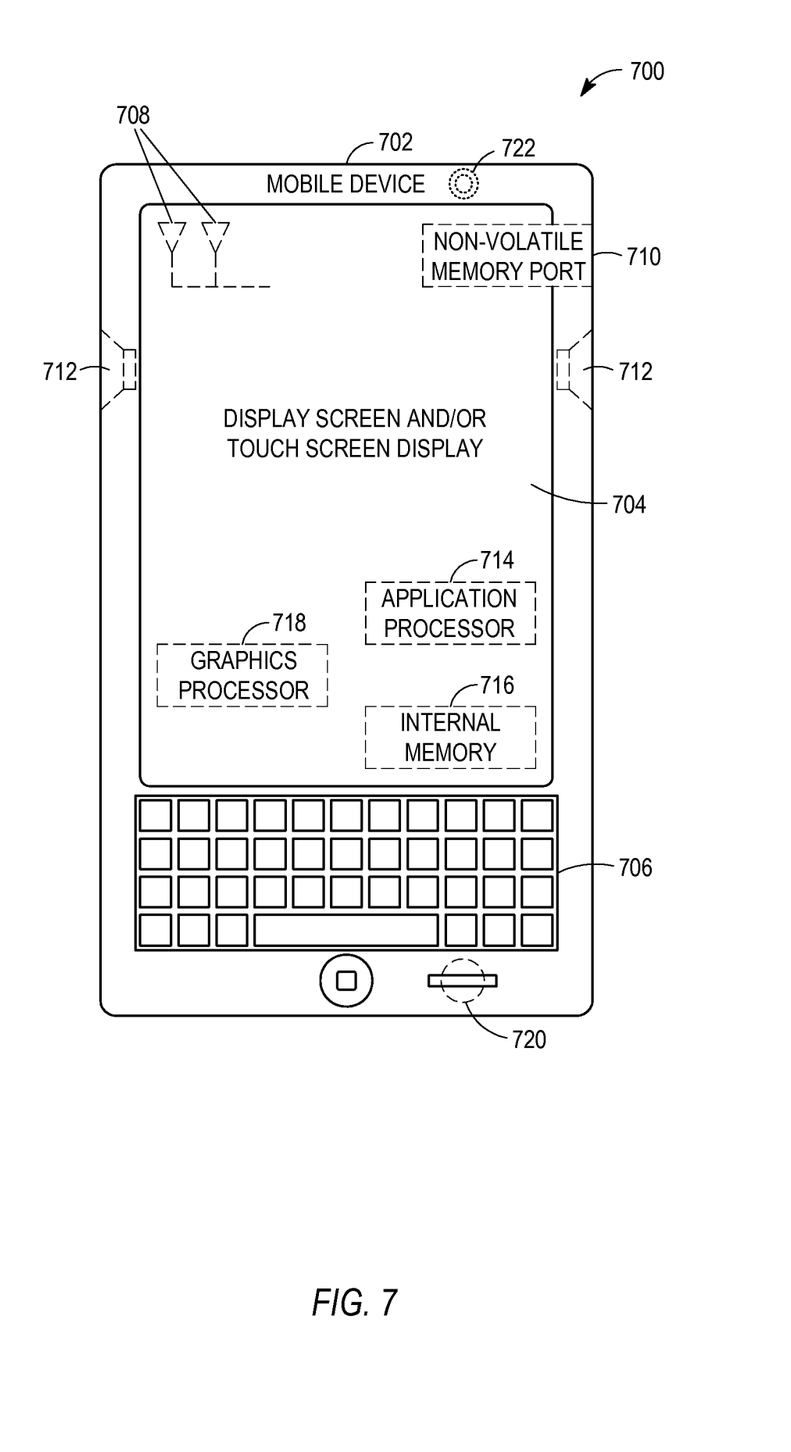
FIG. 7 illustrates aspects of a UE, in accordance with some example embodiments.

FIG. 7 shows an example UE that may be used with any embodiments described above, with the example UE illustrated as UE 700. UE 700 may be an implementation of UE 101, 302, 402, or any other such device described herein. The UE 700 can include one or more antennas configured to communicate with a transmission station, such as a base station (BS), an eNB, or other type of wireless wide area network (WWAN) access point. The UE can be configured to communicate using at least one wireless communication standard including 3GPP LTE, LTE-advanced, WiMAX, High Speed Packet Access (HSPA), Bluetooth, and WiFi or any other such standard. The UE 700 can communicate using separate antennas for each wireless communication standard or shared antennas for multiple wireless communication standards. The UE 700 can communicate in a WLAN, a WPAN, and/or a WWAN.

The UE 700 can be any mobile device, a mobile station (MS), a mobile wireless device, a mobile communication device, a tablet, a handset, or other type of mobile wireless computing device. The UE 700 can include one or more antennas 708 within housing 702 that are configured to communicate with a hotspot, BS, an eNB, or other type of WLAN or WWAN access point. A UE may thus communicate with a WAN such as the Internet via an eNB or base station transceiver implemented as part of an asymmetric RAN as detailed above. UE 700 can be configured to communicate using multiple wireless communication standards, including standards selected from 3GPP LTE, WiMAX, HSPA, Bluetooth, and Wi-Fi standard definitions. The UE 700 can communicate using separate antennas for each wireless communication standard or shared antennas for multiple wireless communication standards. The UE 700 can communicate in a WLAN, a WPAN, and/or a WWAN.

FIG. 7 also shows a microphone 720 and one or more speakers 712 that can be used for audio input and output from the UE 700. A display screen 704 can be a liquid crystal display (LCD) screen, or other type of display screen such as an organic light emitting diode (OLED) display. The display screen 704 can be configured as a touch screen. The touch screen can use capacitive, resistive, or another type of touch screen technology. An application processor 714 and a graphics processor 718 can be coupled to internal memory 716 to provide processing and display capabilities. A non-volatile memory port 710 can also be used to provide data I/O options to a user. The non-volatile memory port 710 can also be used to expand the memory capabilities of the UE 700. A keyboard 706 can be integrated with the UE 700 or wirelessly connected to the UE 700 to provide additional user input. A virtual keyboard can also be provided using the touch screen. A camera 722 located on the front (display screen 704) side or the rear side of the UE 700 can also be integrated into the housing 702 of the UE 700.

Figure 8:
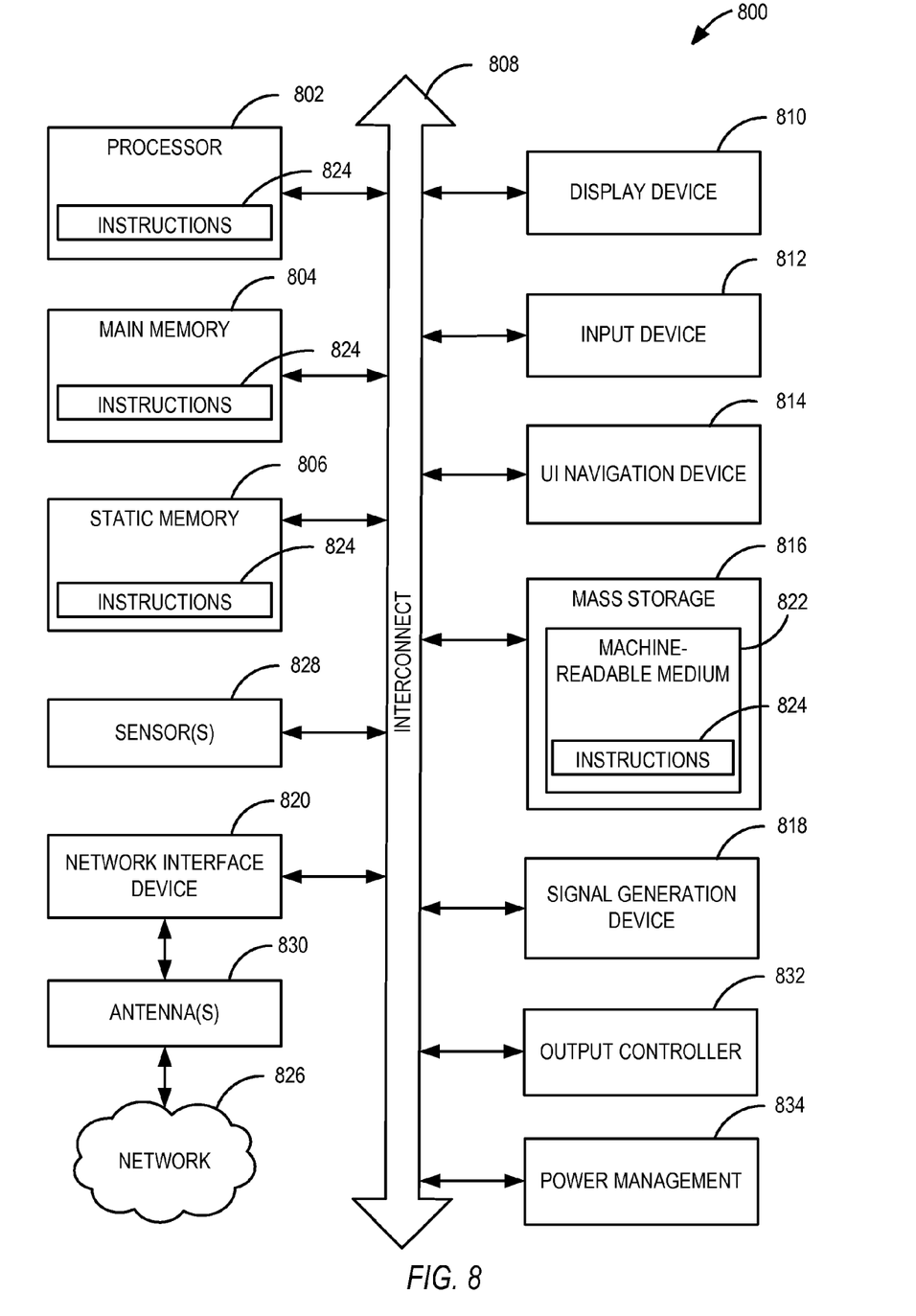
FIG. 8 is a block diagram illustrating an example computer system machine which may be used in association with various embodiments described herein.

FIG. 8 is a block diagram illustrating an example computer system machine 800 upon which any one or more of the methodologies herein discussed can be run, and may be used to implement eNBs 150, 304, 404; MMEs 160, 306, 406; and UEs 101, 302, 402 or any other device described herein. In various alternative embodiments, the machine 800 operates as a standalone device or can be connected (e.g., networked) to other machines. In a networked deployment, the machine 800 can operate in the capacity of either a server or a client machine in server-client network environments, or it can act as a peer machine in peer-to-peer (or distributed) network environments. The machine 800 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 800 includes a processor 802 (e.g., a central processing unit (CPU), a graphics processing unit (GPU) or both), a main memory 804, and a static memory 806, which communicate with each other via an interconnect 808 (e.g., a link, a bus, etc.). The computer system machine 800 can further include a video display device 810, an alphanumeric input device 812 (e.g., a keyboard), and a user interface (UI) navigation device 814 (e.g., a mouse). In one embodiment, the video display unit 810, input device 812, and UI navigation device 814 are implemented with a touch screen display. The computer system machine 800 can additionally include a mass storage 816 (e.g., a drive unit), a signal generation device 818 (e.g., a speaker), an output controller 832, a power management controller 834, and a network interface device 820 (which can include or operably communicate with one or more antennas 830, transceivers, or other wireless communications hardware), and one or more sensors 828, such as a GPS sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor 802 during execution thereof by the computer system machine 800, with the main memory 804, static memory 806, and the processor 802 also constituting machine-readable media.

While the machine-readable medium 822 is illustrated in an example embodiment to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 824 can further be transmitted or received over a communications network 826 using a transmission medium via the network interface device 820 utilizing any one of a number of well-known transfer protocols (e.g., hypertext transport protocol HTTP).

Various techniques, or certain aspects or portions thereof may take the form of program code (i.e., instructions) embodied in tangible media, such as floppy diskettes, CD-ROMs, hard drives, non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronic Engineers (IEEE) 802.11, and Bluetooth communication standards. Various alternative embodiments may use a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 7.0, or like standards defined by the Bluetooth Special Interest Group) standards families. Other applicable network configurations can be included within the scope of the presently described communication networks. It will be understood that communications on such communication networks can be facilitated using any number of PANs, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), RAM, semiconductor memory devices (e.g., EPROM, Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device.

It should be understood that the functional units or capabilities described in this specification may have been referred to or labeled as "components" or "modules" in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. An apparatus of an evolved node B (eNB) for user equipment (UE) radio capability signaling, the apparatus comprising circuitry configured to:
    manage, using the circuitry, communication with a first UE as part of an initial attach procedure, wherein a first set of UE capability information is established as part of the initial attach procedure;
    identify, using the circuitry, a first temporary operating mode for the first UE associated with a second set of UE capability information;
    initiate communication using the circuitry, in response to identifying the first temporary operating mode for the first UE, of a UE mode match indication message from the eNB to a mobility management entity (MME);
    receive, at the apparatus of the eNB, a UE mode match response from the MME;
    initiate communication by the circuitry, in response to receipt of the first temporary operating mode response, of a UE capability enquiry from the eNB to the first UE; and
    receive, at the apparatus of the eNB from the first UE, a UE capability message comprising the second set of UE capability information.

2. The apparatus of claim 1 wherein the circuitry is further configured to:
    identify, by the eNB from the first temporary operating mode response, a change in operation mode for the UE;
    wherein communication of the UE capability enquiry from the eNB to the first UE is further initiated in response to the identification of the change in operating mode for the UE.

3. The apparatus of claim 1 wherein the first set of UE capability information is associated with a normal operating mode where all capabilities configured in the first UE are available for use, and wherein the first set of UE capability information comprises a list of all capabilities of the first UE.

4. The apparatus of claim 3 wherein the second set of UE capability information is associated with a low data rate operating mode where a set of capabilities configured in the first UE are limited for power saving operation.

5. The apparatus of claim 4 wherein the second set of UE capability information comprises a list of capabilities of the first UE limiting inter-radio access technology (RAT) and radio frequency (RF) band capabilities.

6. The apparatus of claim 5 wherein the second set of UE capability information comprises a list of capabilities of the first UE excluding carrier aggregation (CA) and multiple input multiple output (MIMO) capabilities.

7. The apparatus of claim 3 wherein the second set of UE capability information is associated with a low mobility operating mode.

8. The apparatus of claim 7 wherein the second set of UE capability information comprises a list of capabilities of the first UE wherein RF band capabilities of the list of capabilities of the first UE exclude RF band capabilities of the first UE not shared with the eNB.

9. The apparatus of claim 8 wherein the second set of UE capability information further excludes minimization of drive test (MDT) and self-optimising network (SON) capabilities of the first UE.

10. The apparatus of claim 1 wherein the circuitry configured to manage communication with the first UE as part of the initial attach procedure comprises circuitry configured to:
    receive an attach request from the first UE;
    communicate the attach request to the MME;
    receive an initial context setup request from the MME;
    communicate an initial UE capability enquiry to the first UE;
    receive the first set of UE capability information from the UE in response to the initial UE capability enquiry; and
    communicate the first set of UE capability information to the MME.

11. The apparatus of claim 1 wherein the first temporary operating mode for the first UE is identified from a radio resource control (RRC) connection setup complete message received by the apparatus;
    wherein the UE mode match indication message comprises a first temporary operating mode; and
    wherein the UE mode match response comprises a stored temporary operating mode of the UE.

12. The apparatus of claim 11 wherein the first temporary operating mode message comprises a tracking area update (TAU) message; and
    wherein the first temporary operating mode response from the MME comprises a UE initial context setup request.

13. The apparatus of claim 12 wherein the first temporary operating mode is identified within the TAU message.

14. The apparatus of claim 11 wherein the first temporary operating mode message comprises a tracking area update (TAU) message; and
   wherein the first temporary operating mode response from the MME comprises a UE radio capability match request.

15. The apparatus of claim 1 further comprising:
   an antenna coupled to the circuitry, wherein the antenna is configured for communication with the first UE via an air interface.

16. A non-transitory computer-readable medium comprising instructions that, when executed by one or more processors of an evolved node B (eNB), configure the eNB to:
   manage communication with a first user equipment (UE) as part of an initial attach procedure, wherein a first set of UE capability information is established as part of the initial attach procedure;
   identify a first temporary operating mode for the first UE associated with a second set of UE capability information;
   initiate communication, in response to identifying the first temporary operating mode for the first UE, of a first temporary operating mode message from the eNB to a mobility management entity (MME);
   receive a first temporary operating mode response from the MME;
   initiate, in response to receipt of the first temporary operating mode response, communication of a UE capability enquiry from the eNB to the first UE; and
   receive, from the first UE, a UE capability information message comprising the second set of UE capability information.

17. The non-transitory computer readable medium of claim 16 wherein the first temporary operating mode message comprises a UE mode match indication message; and
   wherein the first temporary operating mode response comprises a UE mode match response.

18. The non-transitory computer readable medium of claim 16 wherein the eNB identifies a change in mode for the UE based on the UE mode match response;
   wherein the UE capability enquiry is further initiated based on the identification of the change in mode for the UE.

19. The non-transitory computer readable medium of claim 16 wherein the eNB receives an indication of a change in mode for the UE in the UE mode match response based on an identification of the change in mode by the MME;
   wherein the UE capability enquiry is further initiated based on the indication of the change in mode in the UE mode match response.

20. An apparatus of a user equipment (UE) for UE radio capability signaling, the apparatus comprising circuitry configured to:
   establish, with an evolved node B (eNB) as part of an initial attach procedure, a connection using a first set of capability information;
   communicate, to the eNB, a request for a first temporary operating mode;
   receive, from a mobility management entity (MME) via the eNB, a UE capability enquiry; and
   communicate, from the UE to the eNB in response to the UE capability enquiry, a UE capability information message comprising a second set of UE capability information associated with the first temporary operating mode.

21. The apparatus of claim 20 wherein the circuitry is further configured to:
   communicate, to the eNB, a request for a second temporary operating mode;
   receive, from the MME via the eNB, a second UE capability enquiry; and
   communicate, from the UE to the eNB in response to the second UE capability enquiry, a second UE capability information message comprising a third set of UE capability information associated with the second temporary operating mode;
   wherein the first set of UE capability information, the second set of UE capability information, and the third set of UE capability information each identifies a different set of capabilities for the first UE.

22. An apparatus of a mobility management entity (MME) for user equipment (UE) radio capability signaling, the apparatus comprising circuitry configured to:
   receive a first set of capability information associated with a first UE;
   receive, from an evolved node B (eNB), a tracking area update (TAU) identifying a first temporary operating mode associated with the first UE;
   initiate communication to the eNB of a UE information request in response to the TAU; and
   receive, from the eNB, a second set of capability information for the first UE associated with the first temporary operating mode.

23. The apparatus of the MME of claim 22 wherein the circuitry is further configured to:
   identify, from the TAU, a change in operating mode for the UE;
   wherein the UE information request is further initiated in response to the identification of the change in operating mode.

24. The apparatus of the MME of claim 22 wherein the UE information request comprises a UE initial context setup request.

25. The apparatus of the MME of claim 22 wherein the UE information request comprises a UE radio capability match request.

* * * * *